United States Patent [19]

Sartori et al.

[11] Patent Number: 5,019,666

[45] Date of Patent: May 28, 1991

[54] NON-POROUS POLYCARBONATE MEMBRANES FOR SEPARATION OF AROMATICS FROM SATURATES

[75] Inventors: Guido Sartori; W. S. Winston Ho, both of Annandale; David W. Savage, Lebanon; Robert E. Noone, Neshanic Station; Robert P. Mastondrea, Hackettstown, all of N.J.

[73] Assignee: Exxon Research and Engineering Company, Florham Park, N.J.

[21] Appl. No.: 491,013

[22] Filed: Mar. 9, 1990

Related U.S. Application Data

[63] Continuation-in-part of Ser. No. 228,075, Aug. 4, 1988, abandoned, and a continuation-in-part of Ser. No. 228,076, Aug. 4, 1988, abandoned.

[51] Int. Cl.$^5$ .............................................. C07C 7/144
[52] U.S. Cl. .................................... 585/819; 585/818; 210/500.4; 210/500.27; 210/653; 210/654

[58] Field of Search ............... 210/500.4, 500.27, 654, 210/653; 208/308; 585/818, 819; 528/196

[56] References Cited

U.S. PATENT DOCUMENTS

| 2,923,749 | 2/1960 | Lee et al. | 585/819 |
| 3,305,595 | 2/1967 | Paulson | 585/819 |
| 4,086,310 | 4/1978 | Bottenbruch et al. | 528/196 |
| 4,391,955 | 7/1983 | Hori et al. | 528/196 |
| 4,929,357 | 5/1990 | Schucker | 210/654 |

Primary Examiner—Anthony McFarlane
Assistant Examiner—Nhat D. Phan
Attorney, Agent, or Firm—Ronald D. Hantman

[57] ABSTRACT

The present invention is a method for separating aromatics from saturates using a non-porous polycarbonate membrane. In a preferred embodiment, the polycarbonate membrane may be crosslinked.

18 Claims, 4 Drawing Sheets

NON-POROUS POLYCARBONATE MEMBRANES FOR SEPARATION OF AROMATICS FROM SATURATES

CROSS REFERENCE TO RELATED APPLICATIONS

This is a continuation-in-part of U.S. Ser. No. 228,075 and U.S. Ser. No. 228,076 which were filed Aug. 4, 1988, both now abandoned.

BACKGROUND INFORMATION

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e., aromatic, unsaturated, saturated, by permeating a portion of the mixture through a non-porous cellulose ether membrane and removing permeate from the permeate side of the membrane using a sweep gas or liquid. Feeds include hydrocarbon mixtures, e.g., naphtha (including virgin naphtha, naphtha from thermal or catalytic cracking, etc.).

U.S. Pat. No. 2,930,754 teaches a method for separating hydrocarbons, e.g., aromatic and/or olefins from gasoline boiling range mixtures, by the selective permeation of the aromatic through certain non-porous cellulose ester membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

SUMMARY OF THE INVENTION

The present invention is a method for separating mixtures of aromatics and non-aromatics into aromatic-enriched and non-aromatic-enriched streams by contacting the aromatic/non-aromatic mixture with a non-porous polycarbonate membrane. In the preferred embodiment, the membrane is synthesized from phosgene and an aromatic diol, preferably Bisphenol A.

In another embodiment of the present invention, the polycarbonate membrane is crosslinked thermally, preferably, in the presence of copper acetylacetonate.

DESCRIPTION OF THE PREFERRED EMBODIMENT

Figure 1:
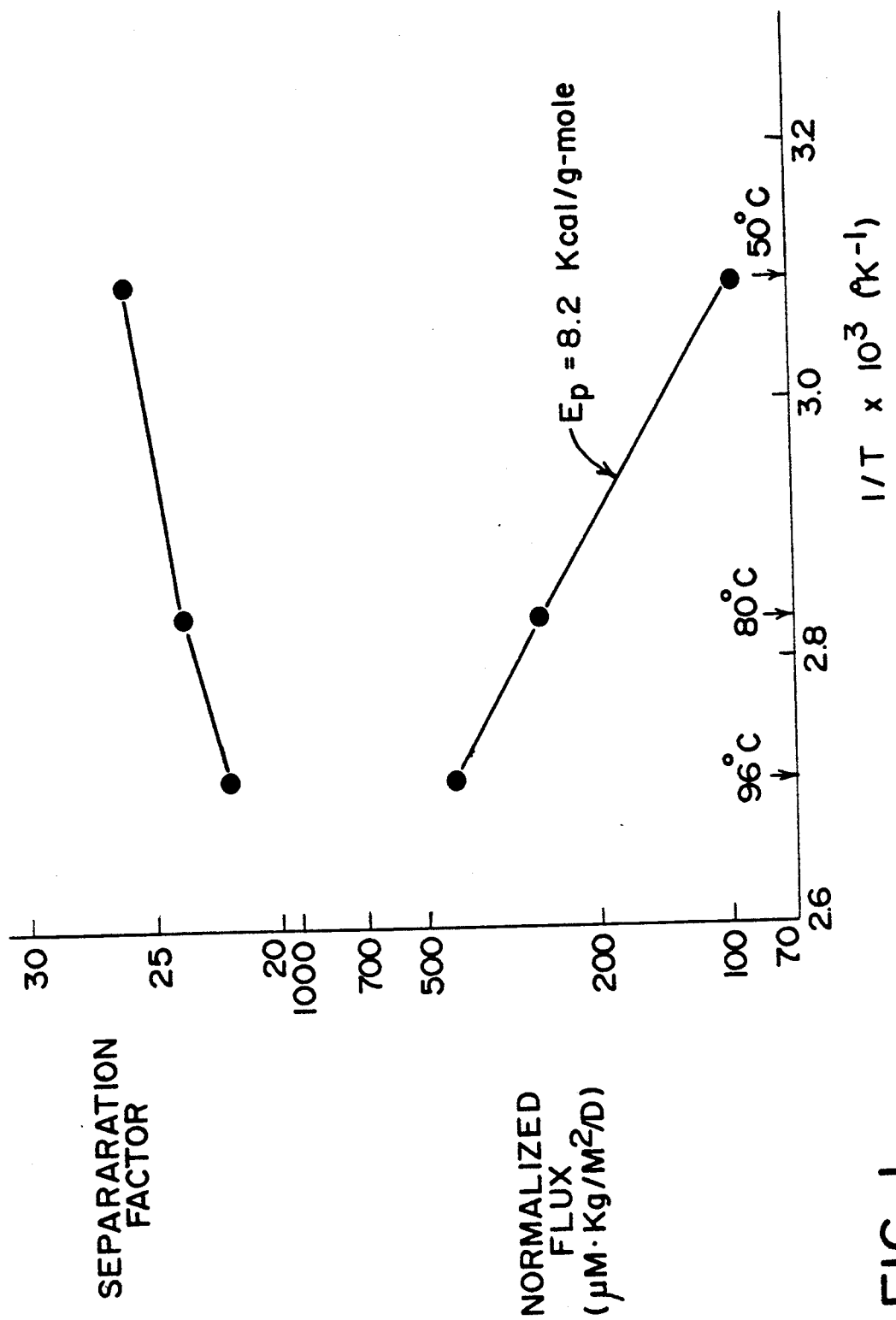
FIG. 1 shows the results of the separation of toluene from isooctane using the method of the present invention with a polycarbonate membrane having a molecular weight of 32,000.

The present invention is a method for separating mixtures of aromatics from non-aromatics using a non-porous polycarbonate membrane. In a preferred embodiment, the polycarbonate membrane is an aromatic polycarbonate. More preferably, it is a homopolymeric polycarbonate containing aromatic rings. Most preferred, the polycarbonate membrane is derived from Bisphenol A. In another embodiment of the present invention, the polycarbonate membrane is crosslinked.

Polycarbonates can be synthesized from a source including the carbonyl group. In a preferred embodiment, the source is phosgene. If the membrane includes aromatic rings, then it can be synthesized from phosgene and aromatic diols such as Bisphenol A, Bisphenol F and Bisphenol S. Various grades of Bisphenol A polycarbonate are commercially available. Instead of phosgene, other carbonate precursors such as diphenyl carbonate and dimethyl carbonate can be used in the synthesis of the claimed polycarbonates.

Polycarbonates other than the Bisphenol A derivative can be used, as well as their blends with other polymers.

Polycarbonate membranes can be obtained by preparing a concentrated solution in a suitable solvent, e.g., a chlorinated hydrocarbon, casting on a glass plate, adjusting the thickness by means of a casting knife and drying the membrane first at room temperature, then at 120° C. for a night.

Crosslinked polycarbonate membranes can be obtained by preparing a concentrated solution of polycarbonate in a suitable solvent, e.g., a chlorinated hydrocarbon, adding cupric acetylacetonate, casting on a glass plate, adjusting the thickness by means of a casting knife, drying the membrane and then heating it at 180°-230° C. for several hours.

The membranes are useful for the separation of aromatics from saturates in petroleum and chemical streams, and have been found to be particularly useful for the separation of large substituted aromatics from saturates as are encountered in heavy cat naphtha streams. Other streams which are also suitable feed streams for aromatics from saturates separation are intermediate cat naphtha streams (93°–160° C.), light aromatics content streams boiling in the $C_5$–150° C. range, light catalytic cycle oil boiling in the 200°–345° C. range as well as streams in chemical plants which contain recoverable quantities of benzene, toluene, xylenes (BTX) or other aromatics in combination with saturates. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams) the aromatic molecules present in the feedstream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$–$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and emerge on the permeate side under the influence of a concentration gradient. Pervaporative separation of aromatics from saturates can be performed at a temperature of about 25° C. for the separation of benzene from hexane but for separation of heavier aromatic/saturate mixtures, such as heavy cat naphtha, higher temperatures of at least 80° C. should be used. Temperatures of about 100° C. and higher have been successfully used with polycarbonate membranes of the present invention, the maximum upper limit being that temperature at which the membrane is physically damaged. Vacuum on the order of 1–50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the internal space of the tube or fiber, the other material obviously being on the other side.

Most conveniently, the membrane is used in a hollow fiber configuration with the feed introduced on the exterior side of the fiber, the sweep liquid flowing on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

The present invention will be better understood by reference to the following Examples which are offered by way of illustration and not limitation.

In the following examples, membranes are used to separate toluene from isooctane. The initial mixture contains approximately equal weights of the two hydrocarbons.

The examples show that polycarbonate membranes can separate toluene from isooctane. The following examples illustrate the invention.

In addition, the examples show that cross-linked polycarbonate membranes can separate toluene from isooctane.

The examples were carried out in a pervaporation technique as described above. The pervaporation apparatus is a cell, separated into two compartments by a porous metal plate, on which the membrane is supported. During a pervaporation experiment the toluene-isooctane mixture is circulated through the upper compartment at the desired temperature. The lower compartment is kept at reduced pressure. The permeate is collected in a trap cooled with dry ice-acetone or isopropanol and periodically analyzed by gas chromatography.

EXAMPLE 1

25 g of Bisphenol A polycarbonate having a molecular weight of about 32,000 was dissolved with agitation in 165 g of chloroform at room temperature. Undissolved particles were separated by centrifugation, then the thick solution was cast on a glass plate. Two casting-knife openings were used, i.e., 15 and 12 mils. After most chloroform evaporated at room temperature, the glass plates were put into an oven at 120° C. and left there overnight. The dried films were non-porous and were 1.5 and 2.0 mils thick. FIG. 1 shows the results of the prevaporation experiments. In the interval of temperatures between 50° C. and 96° C. the toluene/isooctane separation factor was always above 20. The separation factor is the toluene/isooctane ratio in the permeate divided by the same ratio in the starting mixture. In FIG. 1 the permeability represented by the normalized flux in Kg·μM/M$^2$/D shows Arrhenius dependency on temperature with an activation energy of 8.2 kcal/g-mole for permeation.

EXAMPLE 2

Figure 2:
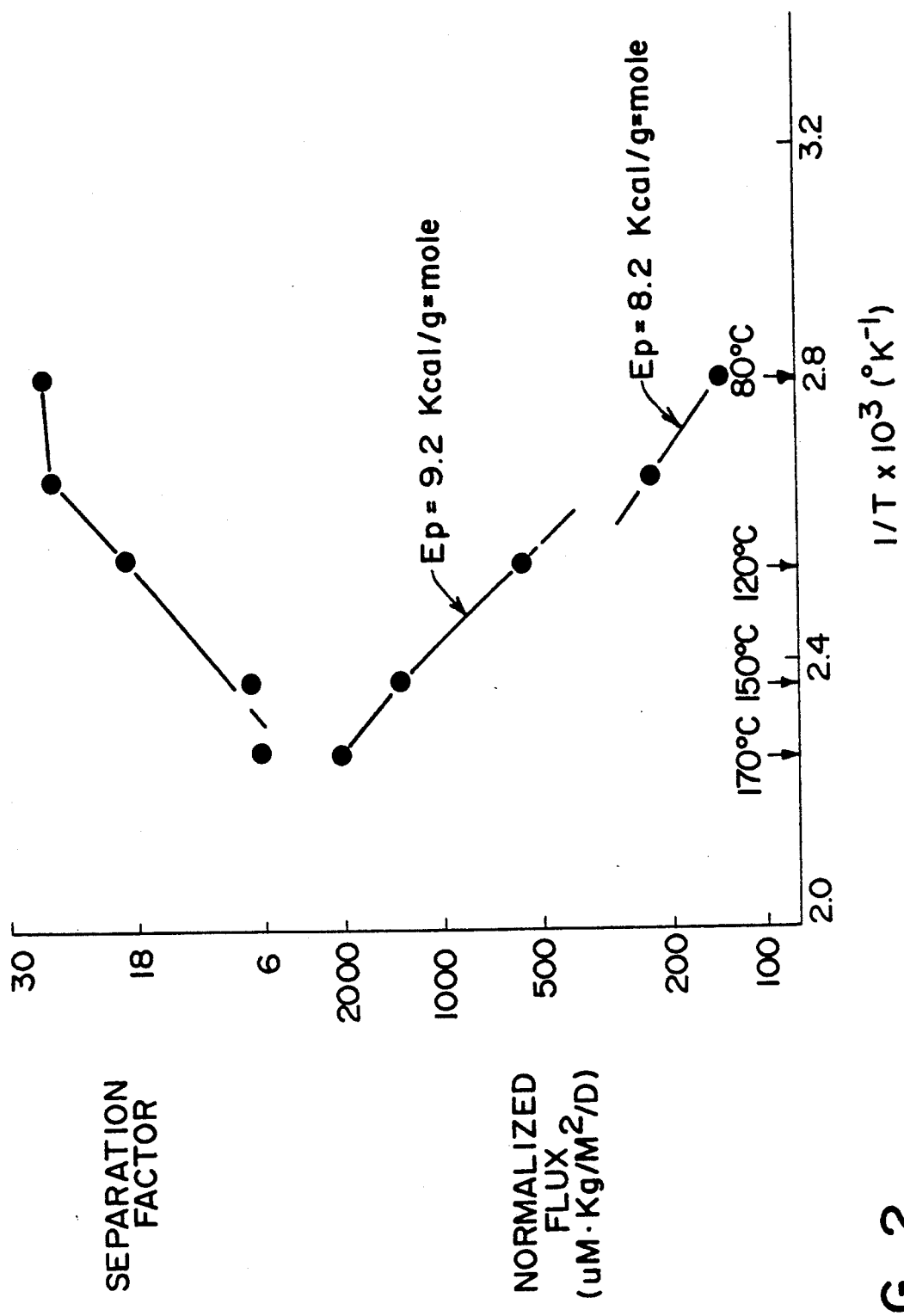
FIG. 2 shows the results of the separation of toluene from isooctane using the method of the present invention with a polycarbonate membrane having a molecular weight of 48,000.

15 g of Bisphenol A polycarbonate having a molecular weight of around 48,000 was dissolved in 85 g of chloroform. After removing undissolved particles by centrifugation, membranes were cast on glass plates, using a 20 mil knife opening. After most chloroform evaporated at room temperature, the glass plates were put into an oven at 120° C. for 19 hours. FIG. 2 shows the results of the pervaporation experiments. The separation factor for toluene vs. isooctane between 80° C. and 100° C. was above 20. The separation factor decreased with increasing temperature. However, the permeability increased with increasing temperature. The permeability showed Arrhenius dependency on temperature with an activation energy of 8.2 kcal/g-mole for temperatures ranging from 80° C. to 100° C. The activation energy was the same as that for the polycarbonate of MW 32,000 shown in FIG. 1. As shown in FIG. 2, the activation energy for temperatures ranging from 120° C. to 170° C. was 9.2 kcal/g-mole. It appears that there ws a phase transition at a temperature between 100° C. and 120° C.

EXAMPLE 3

15 g of Bisphenol A polycarbonate having a molecular weight of 47,900 was dissolved with agitation in 85 g of methylene chloride. When dissolution was complete, 0.14 g of cupric acetyl-acetonate was added. Undissolved material was separated by centrifugation, then films were cast on a glass plate, using a knife opening of 20 mils. One of the films was heated in an oven at 120° C. overnight, then at 230° C. for 24 hours. A small piece put into chloroform with agitation did not dissolve, i.e., it was crosslinked. Table 1 shows that the membrane has higher flux and selectivity for toluene compared to the uncrosslinked membrane.

EXAMPLE 4

Figure 3:
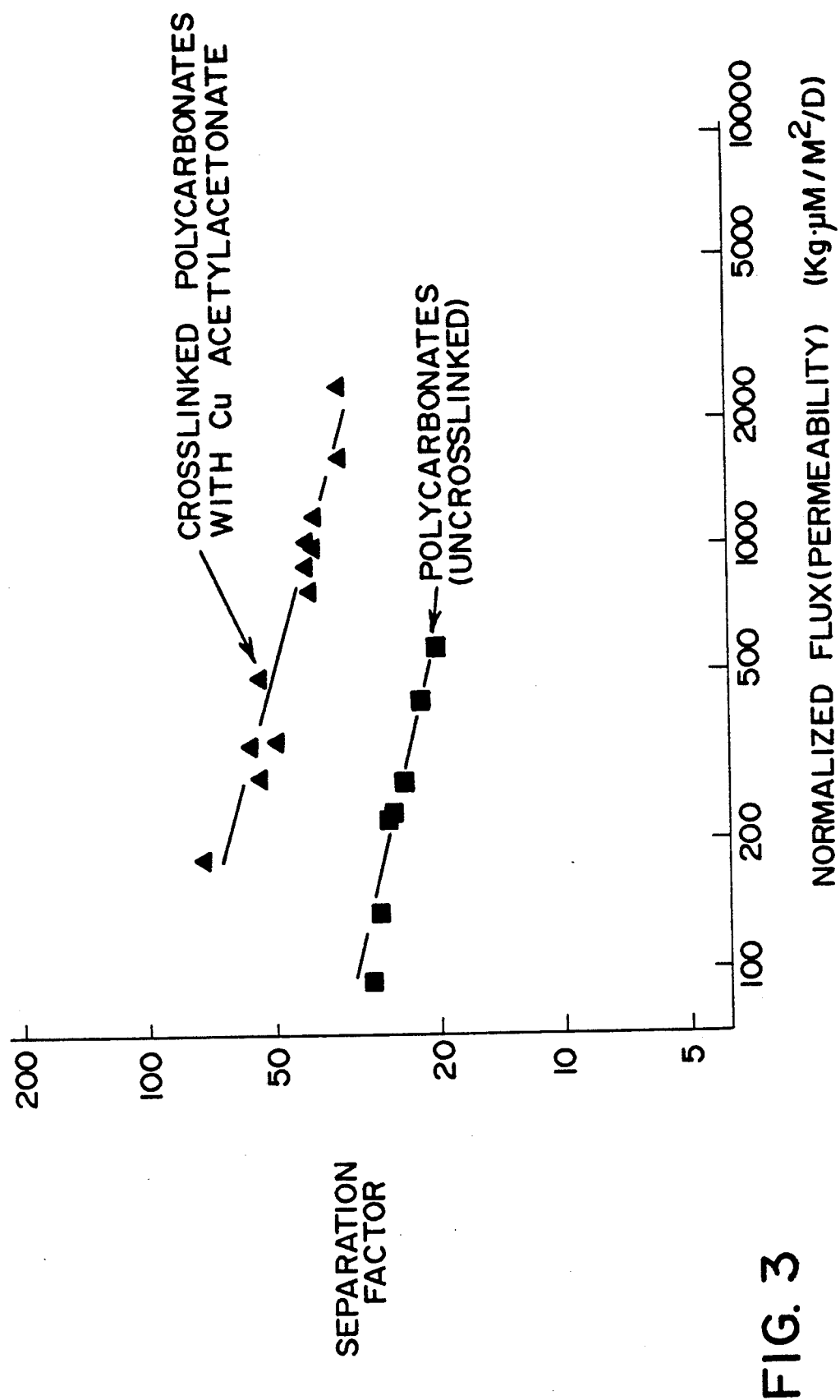
FIG. 3 shows the results of the separation of toluene from isooctane using the method of the present invention with a polycarbonate membrane crosslinked with cupric acetylacetonate in comparison with the results using an uncrosslinked polycarbonate membrane.

18.75 g of Bisphenol A polycarbonate, MW 47,900, was dissolved with agitation in 106.25 g of methylene chloride. 0.175 g of cupric acetylacetonate was added; insoluble material was separated by centrifugation, then the thick solution was cast on glass plates, using a knife opening of 20 mils. The membranes were heated for 22 hours at 120° C., for another 22 hours at 140° C. and for another 22 hours at 160° C. Finally, one was heated at 180° C. for 17 hours, the second one was heated at the same temperature for 34 hours, and the third one was heated at the same temperature for 51 hours. Table 1 shows the results of pervaporation experiments. This table shows that the crosslinked membranes, including the one described in Example 3, have higher toluene/isooctane selectivity and flux than the uncrosslinked one. This table also shows the effect of crosslinking condition on selectivity and flux. FIG. 3 shows that these crosslinked membranes have higher toluene/isooctane selectivity than the uncrosslinked one at a given flux.

TABLE 1

Crosslinking of Polycarbonate with Cu Acetylacetonate Increases Toluene Selectivity/Permeability

| Polycarbonate Membranes | Crosslinking Condition | Selectivity* | Normalized Flux* (Permeability) (Kg · μM/M²/D) |
| --- | --- | --- | --- |
| Uncrosslinked | — | 26 | 225 |
| Crosslinked with | 230° C./24 hr | 56 | 280 |
| Cu Acetylacetonate | 180° C./17 hr** | 34 | 1590 |
| | 180° C./34 hr** | 40 | 790 |
| | 180° C./51 hr** | 77 | 185 |

*Pervaporation of toluene/isooctane at 100° C.
** Prior to this drying, membrane was dried at 120° C./22 hr., 140° C./22 hr., 160° C./26 hr.

EXAMPLE 5

Figure 4:
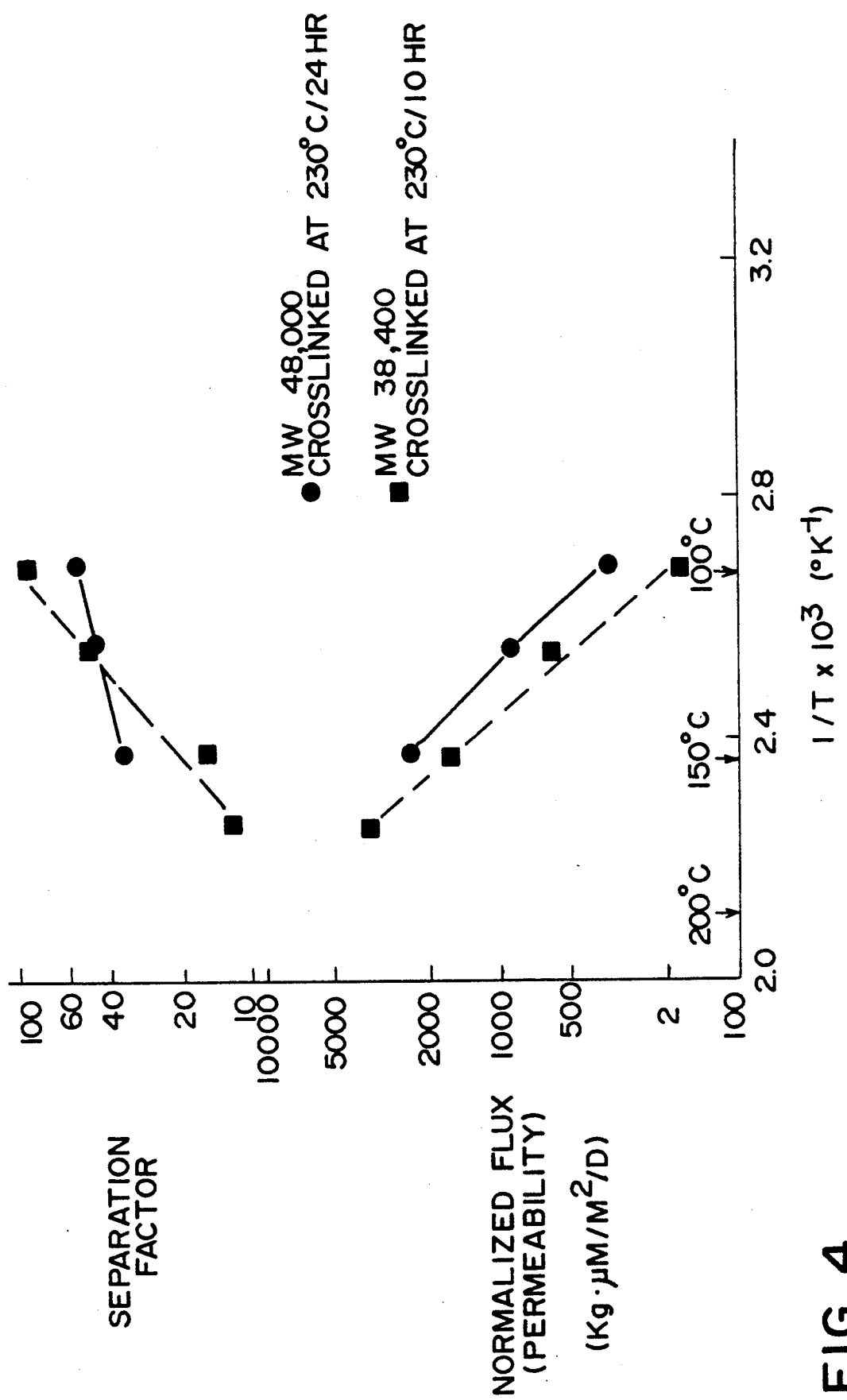
FIG. 4 shows the effects of molecular weight and crosslinking on the separation factor and flux at various temperatures for the membrane in the preferred embodiment of the present invention.

Four crosslinked Bisphenol A polycarbonate membranes, MW 38,400, were prepared in the same procedures described in Example 4 except crosslinking conditions. In the crosslinking conditions, the first membrane was heated at 120° C. for 22 hours, 140° C. for 22 hours, 160° C. for 26 hours and finally at 180° C. for 17 hours; the second one was heated at 120° C. for 22 hours and finally at 230° C. for 24 hours; the third one was heated at 120° C. for 22 hours, 160° C. for 24 hours, and finally at 230° C. for 20 hours; and the fourth one was heated at 120° C. for 22 hours, 160° C. for 24 hours, and finally at 230° C. for 10 hours. Table 2 shows the selectivity and flux results in the pervaporation of toluene/isooctane mixture at 120° C. for these membranes in comparison with those for the membranes of MW 47,900 polycarbonate crosslinked finally at 180° C. for 17 hours and described in Example 4 and crosslinked finally at 230° C. for 24 hours and described in Example 3. This table shows that polycarbonate molecular weight appears to affect membrane performance significantly. The low molecular weight membrane crosslinked at 180° C. for 17 hours has lower selectivity but higher permeability than the higher molecular weight one crosslinked at the same conditions. With crosslinking at 230° C. for 24 hours, the low molecular weight membrane is brittle whereas the high molecular weight one is quite strong. The low molecular weight membrane crosslinked at 230° C. for 20 hours is also quite brittle. However, the crosslinking of the low molecular weight membrane at 230° C. for 10 hours results in good mechanical strength, high toluene/isooctane selectivity and good flux. Thus, the crosslinking condition appears to affect membrane performance significantly. FIG. 4 shows the effects of molecular weight and crosslinking condition on separation factor and flux at various temperatures. As shown in this figure, the high molecular weight, crosslinked membrane maintains high selectivity at high temperature, e.g., a separation factor of about 35 at 150° C., and the membrane is preferred for the high temperature separation.

TABLE 2

Polycarbonate Molecular Weight And Crosslinking Condition Appear To Affect Membrane Performance Significantly

| Polycarbonate Molecular Weight | Crosslinking Condition | Selectivity + | Normalized Flux + (Permeability) (Kg · μM/M²/D) |
| --- | --- | --- | --- |
| Low (MW 38,400) | 180° C./17 Hr* | 10 | 2120 |
| | 230° C./24 Hr | Brittle Membrane | |
| | 230° C./20 Hr** | Brittle Membrane | |
| | 230° C./10 Hr** | 50 | 590 |
| High (MW 47,900) | 180° C./17 Hr* | 30 | 1500 |
| | 230° C./24 Hr | 42 | 880 |

+ Pervaporation of toluene/isooctane at 120° C.
*Prior to this drying, membrane was dried at 120° C./22 Hr., 140° C./22 Hr., 160° C./22 Hr.
**Prior to this drying, membrane was dried at 120° C./22 Hr., 160° C./24 Hr.

What is claimed is:

1. A method for separating mixtures of aromatics and non-aromatics into aromatic-enriched and non-aromatic-enriched streams comprising:
    (a) contacting said aromatics/non-aromatics mixture with one side of a non-porous polycarbonate membrane, and
    (b) selectively permeating the aromatic components of the mixture through the membrane.

2. The method of claim 1 wherein said membrane is synthesized from a source including the carbonyl group and a source including aromatic rings.

3. The method of claim 1 wherein said polycarbonate membrane is an aromatic polycarbonate.

4. The method of claim 1 wherein said membrane is obtained by casting a polycarbonate solution.

5. The method of claim 1 wherein said membrane is synthesized from phosgene and an aromatic diol.

6. The method of claim 3 wherein said membrane is synthesized from phosgene and Bisphenol A.

7. The method of claim 1 wherein the separation is performed under pervaporation conditions.

8. The method of claim 1 wherein the separation is performed under perstraction conditions.

9. The method of claim 1 wherein the aromatics/non-aromatics mixtures are selected from heavy cat naphtha streams, intermediate cat naphtha streams, light aromatic streams boiling in the $C_5\cdot/150°$ C. range, and light cat cycle oils boiling in the 200°–345° C. range.

10. The method of claim 1 wherein said polycarbonate membrane is a crosslinked polycarbonate membrane.

11. The method of claim 10 wherein said membrane is obtained by casting a polycarbonate solution and crosslinking the membrane thermally in the presence of air or oxygen.

12. The method of claim 10 wherein said membrane is synthesized from a source including the carbonyl group and a source including aromatic rings.

13. The method of claim 10 wherein said membrane is synthesized from phosgene and an aromatic diol and crosslinked thermally in the presence of cupric acetylacetonate and air or oxygen.

14. The method of claim 10 wherein said polycarbonate membrane is an aromatic polycarbonate.

15. The method of claim 12 wherein said membrane is synthesized from phosgene and Bisphenol A and crosslinked thermally in the presence of cupric acetylacetonate and air or oxygen.

16. The method of claim 10 wherein the separation is performed under pervaporation conditions.

17. The method of claim 10 wherein the separation is performed under perstraction conditions.

18. The method of claim 10 wherein the aromatics/non-aromatics mixtures are selected from heavy cat naphtha streams, intermediate cat naphtha streams, light aromatic streams boiling in the $C_5\cdot$–150° C. range, and light cat cycle oils boiling in the 200°–345° C. range.

* * * * *